INVENTORS
LAWRENCE R. SPARROW
JERRY BRAIMAN

United States Patent Office 3,319,133
Patented May 9, 1967

3,319,133
FOAM POTTING OF ALUMINUM ELECTROLYTIC
CAPACITORS
Lawrence R. Sparrow and Jerry Braiman, Indianapolis,
Ind., assignors to P. R. Mallory & Co. Inc., Indianapolis, Ind., a corporation of Delaware
Filed Jan. 11, 1965, Ser. No. 424,570
8 Claims. (Cl. 317—230)

ABSTRACT OF THE DISCLOSURE

In a capacitor assembly a foam material filling the space between the capacitor unit and the walls of a container for the unit, the foam material being the expanded product of an expandable foam product.

---

The present invention relates to electrolytic capacitors, and more particularly relates to means for insulating and mechanically securing aluminum electrolytic capacitors in their casings.

Aluminuum dry electrolytic capacitors are often subjected to vibrations during operation and thus must be insulated from and mechanically secured to their casings. It is known in the art to both insulate and mechanically secure the capacitor body within the casing by means of asphaltic materials. Although asphaltic materials are widely used in the art, they have a number of disadvantages. The obtaining of a satisfactory assembly using asphaltic material becomes incrasingly difficult as the size of the enclosing case is reduced to approach the size of the active unit, and this factor makes it difficult to ensure complete enclosure of the active elements within the casing. A further disadvantage is the extremely high temperatures required to lower the viscosity of the asphaltic material so that it will flow into the small space between the casing and the capacitor body. The temperatures dry out the external layers of the capacitor and overheat the electrolytic compound, resulting in undesirable decompoistion thereof. Further difficulties are encountered from the temperature of the system. There is constant possibility of fire, burns to personnel, and the material in the heating pots often carbonizes, which in turn clogs the feeding nozzles and necessitates the shutting down of the operation and cleaning of the equipment.

The aforementioned difficulties have lead to various attempts of improving the insulating and securing means. In U.S. Patent No. 2,123,713 issued July 12, 1938, Clark and Ruscetta attempted to overcome the difficulties associated with the use of asphaltic materials by encasing the capacitor body in pre-formed protective insulating jacket. The jackets were of natural or artificial rubber compounds which were electrically insulating and impervious and chemically resistant to the electrolyte used. A number of other potting means were tried and discarded because of expense, as in the Clark invention, or because of unsatisfactory performance.

The major means used today for insulating and mechanically securing aluminum electrolytic capacitors in their containers are asphaltic materials and springs, the most common one being asphalt because of its low cost.

Therefore, it is an object of the present invention to provide a means for potting capacitators which overcomes the disadvantages of prior art.

It is an object of the present invention to provide an economical means for insulating and mechanically securing aluminum electrolytic capacitor bodies in their containers which provides superior anchoring.

It is an object of the present invention to provide a low temperature potting system which eliminates drying of the electrolyte and the aforementioned high temperature hazards.

The present invention, in another of its aspects, relates to novel features of the instrumentalities described herein for teaching the principal objects of the invention and to the novel principles employed in the instrumentalities whether or not these features and principles may be used in the said object or in the said field.

Other objects of the present invention and the nature thereof will become apparent from the following description taken in conjunction with the accompanying drawings in which.

Generally speaking, the present invention provides a means for insulating and mechanically securing an aluminum electrolytic capacitor within its casing so that the capacitor does not tear loose from its tabs during vibration. A predetermined volume of a thermoplastic, thermosetting plastic or ceramic material capable of foaming at low temperatures is added to the capacitor can. The wound, impregnated capacitor body is placed in the can and the unit is sealed by any suitable means. The sealed unit is subjected to a temperature of 85° C. for two hours to effect foaming and curing so as to obtain rigidity in the foam. The materials used are all inexpensive and commercially available as is asphalt. Depending upon choice of materials, foaming will occur at room temperature or at slightly elevated temperatures up to 105° C.

Figure 1:
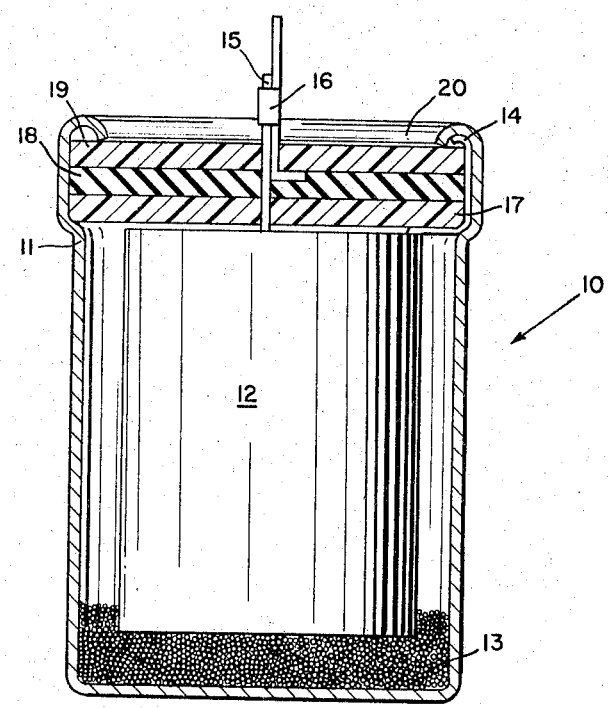
FIGURE 1 is a sectional view of the assembled capacitor prior to foaming.
Figure 2:
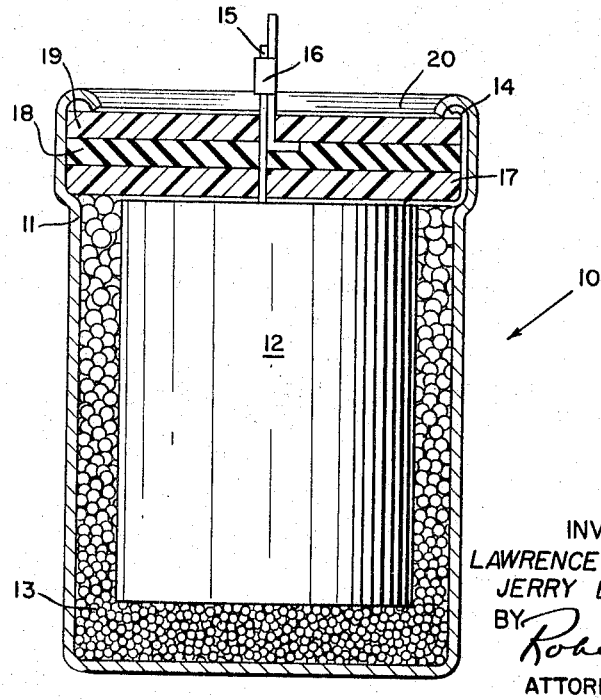
FIGURE 2 is a sectional view of the assembled capacitor after foaming and curing.

Referring to the drawings, FIGURES 1 and 2 illustrate a conventional convolutely wound capacitor 10, having a metal casing 11, and a capacitor unit 12 of the rolled type including armatures or electrodes 14 and 15 of a suitable metal such as aluminum, tantalum and the like. In the convolutely wound type of capacitor, the electrodes normally consist of aluminum foil strips, the anode strip 15 being formed and the cathode strip 14 unformed.

A porous spacer (not shown) is interposed between the electrodes. The rolled unit 12 is immersed for a suitable period of time and under suitable conditions of temperature and pressure in the desired electrolytic compound, and then cooled and cured in accordance with conventional means. After curing, the capacitor unit 12 is ready for mounting and sealing in the casing 11 in accordance with the present invention which will now be described in detail.

There are a number of thermoplastic and thermosetting resins capable of foaming which are suitable in the practice of the present invention. For illustrative purposes, only several will be described. In FIGURE 1, a predetermined volume of a thermoplastic material such as polystyrene foam powder 13, is placed in container 11. The unexpanded powder is in the form of beads. Capacitor body 12 is positioned in container 11 so that a portion of powder 13 is forced upward between the sides of capacitor body 12 and container 11. The unit is sealed by any conventional sealing means. For illustrative purposes, a rigid gasket 17 of a material as phenolic rubber gasket 18 and rigid gasket 19 are placed over anode lead 15, anode lead clamp 16 is secured and the top portion 20 of container 11 is crimped to mechanically secure the seal. Capacitor 10 is then placed in an oven at 85° C. to effect the foaming and curing of material 13.

FIGURE 2 illustrates material 13 after the foaming and curing process. Material 13 expands during foaming and fills all voids between capacitor body 12 and container 11. This assures a good mechanical seal as the expanded foam takes up all the available space within the unit and this guarantees no mechanical vibration. Asphalt potting materials, however, do not provide a fill for all available space and therefore are not as satisfactory as the foam.

Polyurethane is also an excellent foaming material for the practice of the present invention. The polyurethane is dispensed as a liquid at room temperature. A predetermined volume is dispensed into the container, the capacitor body added, the unit sealed and subjected to a temperature of 85° C. for approximately two hours to effect foaming and curing of the foam. Epoxy foams are also in granular form and are utilized in the same manner as the polystyrene foam. Ceramic foams which set at room temperature either by formation of silicates or water of crystallization may also be used.

Most of the aforementioned materials foam at room temperature, but an elevated temperature of approximately 85° C. is utilized to speed the foaming and curing.

The volume of material depends upon the specific foaming material used, the curing temperature and the application. A two pound density polystyrene foam has an expansion ratio of 5 to 1. A five pound density polyurethane foam has an expansion ratio of 20 to 1. Ideal expansion ratios for the present application are 12–25 to 1 or a 5 to 10 pound density foam.

The use of thermoplastic thermosetting resin foams for potting materials in electronic devices such as capacitors, have a number of advantages over the current art: a superior anchoring and mechanical seal between the capacitor unit and the container is obtained; the material is introduced with greater ease; the system operates at cooler temperatures, room temperature to 85° C.; can foam in place; the foam produces a lighter weight unit; and as the clean up operation and carbonizing of the potting material feed system is eliminated, a more economical unit is obtained.

It is to be understood that all matters as hereinbefore set forth are to be considered illustrative and not exhaustive in scope, and that all changes and modifications which do not depart from the spirit and scope of the invention are to be included therein.

Having thus described our invention, we claim:

1. In a capacitor assembly comprising: a capacitor unit having electrical terminal connections extending therefrom; a container enclosing said capacitor unit, said container having walls and an open end, said container having greater length and cross sectional area than said capacitor unit providing a space between said capacitor unit and both said walls of the container; a cap sealing the open end of said container with said terminals insulatively extending therethrough; a foam material filling the space between said capacitor unit and said walls of the container, said foam material being the in situ expanded foam product of an expandable foam material disposed in the space between said capacitor unit and said walls of the container, said foam material providing a mechanical insulative support for said capacitor unit and preventing mechanical vibration of the unit within said container.

2. In a capacitor assembly comprising: a capacitor unit having electrical terminal connections extending therefrom; a container enclosing said capacitor unit, said container having walls and an open end, said container having greater length and cross sectional area than said capacitor unit providing a space between said capacitor unit and both said walls of the container; a cap sealing the open end of said container with said terminals insulatively extending therethrough; a thermoplastic foam material filling the space between said capacitor unit and said walls of the container, said foam material being the in situ expanded foam product of an expandable thermoplastic material disposed in the space between said capacitor unit and said walls of the container, said foam material providing a mechanical insulative support for said capacitor unit and preventing mechanical vibration of the unit within said container.

3. In a capacitor assembly comprising: a capacitor unit having electrical terminal connections extending therefrom; a container enclosing said capacitor unit, said container having walls and an open end, said container having greater length and cross sectional area than said capacitor unit providing a space between said capacitor unit and both said walls of the container; a cap sealing the open end of said container with said terminals insulatively extending therethrough; a thermosetting plastic foam material filling the space between said capacitor unit and said walls of the container, said foam material being the in situ expanded foam product of an expandable thermosetting plastic foam material disposed in the space between said capacitor unit and said walls of the container, said foam material providing a mechanical insulative support for said capacitor unit and preventing mechanical vibration of the unit within said container.

4. In a capacitor assembly comprising: a convolutely wound aluminum electrolytic capacitor unit having electrical terminal connections extending outwardly from one end thereof; a tubular container enclosing said capacitor unit, said container having a side wall, an open end and a closed end wall, said container having greater length and cross sectional area than said capacitor unit providing a space between said capacitor unit and both said walls of the container; a cap sealing the open end of said container with said terminals insulatively extending therethrough; a thermoplastic foam material filling the space between said capacitor unit and both said walls of the container, said foam material being the in situ expanded foam product of an expandable thermoplastic material disposed in the space between said capacitor unit and said walls of the container, said foam material providing a mechanical insulative support for said capacitor unit and preventing mechanical vibration of the unit within said container.

5. In a capacitor assembly comprising: a convolutely wound aluminum electrolytic capacitor unit having electrical terminal connections extending outwardly from one end thereof; a tubular container enclosing said capacitor unit, said container having a side wall, an open end and a closed end wall, said container having greater length and cross sectional area than said capacitor unit providing a space between said capacitor unit and both said walls of the container; a cap sealing the open end of said container with said terminals insulatively extending therethrough; a thermosetting plastic foam material filling the space between said capacitor unit and both said walls of the container, said foam material being the in situ expanded foam product of an expandable thermosetting plastic material disposed in the space between said capacitor unit and said walls of the container, said foam material providing a mechanical insulative support for said capacitor unit and preventing mechanical vibration of the unit within said container.

6. In a capacitor assembly comprising: a convolutely wound aluminum electrolytic capacitor unit having electrical terminal connections extending outwardly from one end thereof; a tubular container enclosing said capacitor unit, said container having a side wall, an open end and a closed end wall, said container having greater length and cross sectional area than said capacitor unit providing a space between said capacitor unit and both said walls of the container; a cap sealing the open end of said container with said terminals insulatively extending therethrough; a polystyrene foam material filling the space between said capacitor unit and both said walls of the container, said foam material being the in situ expanded foam product of an expandable polystyrene material disposed in the space between said capacitor unit and said walls of the container, said foam material providing a mechanical insulative support for said capacitor unit and preventing mechanical vibration of the unit within said container.

7. In a capacitor assembly comprising: a convolutely wound aluminum electrolytic capacitor unit having electrical terminal connections extending outwardly from one end thereof; a tubular container enclosing said capacitor unit, said container having a sidewall, an open end and a closed end wall, said container having greater length and cross sectional area than said capacitor unit providing a space between said capacitor unit and both said walls of the container; a cap sealing the open end of said container with said terminals insulatively extending therethrough; a thermosetting plastic foam material selected froom the group consisting of polyurethane and epoxy foams filling the space between said capacitor unit and both said walls of the container, said foam material being the in situ expanded foam product of an expandable thermosetting plastic material disposed in the space between said capacitor unit and said walls of the container, said foam material providing a mechanical insulative support for said capacitor unit and preventing mechanical vibration of the unit within said container.

8. In a capacitor assembly comprising: a convolutely wound aluminum electrolytic capacitol unit having electrical terminal connections extending outwardly from one end thereof; a tubular container enclosing said capacitor unit, said container having a side wall, an open end and a closed end wall, said container having greater length and cross sectional area than said capacitor unit providing a space between said capacitor unit and both said walls of the container; a cap sealing the open end of said container with said terminals insulatively extending therethrough; a ceramic foam material filling the space between said capacitor unit and both said walls of the container, said foam material being the in situ expanded foam product of an expandable ceramic material disposed in the space between said capacitor unit and said walls of the container, said foam material providing a mechanical insulative support for said capacitor unit and preventing mechanical vibration of the unit within said container.

References Cited by the Examiner
UNITED STATES PATENTS

| | | | |
|---|---|---|---|
| 2,266,523 | 12/1941 | Waterman | 317—230 |
| 2,535,945 | 12/1950 | Menschik et al. | 317—230 |
| 3,221,217 | 11/1965 | Hucke | 317—230 |

JAMES D. KALLAM, *Primary Examiner.*